(12) United States Patent
Walters et al.

(10) Patent No.: US 8,356,486 B2
(45) Date of Patent: Jan. 22, 2013

(54) APU BLEED VALVE WITH INTEGRAL ANTI-SURGE PORT

(75) Inventors: Jeremy J. Walters, San Diego, CA (US); Robert W. Smith, Lakeside, CA (US); Anthony C. Jones, San Diego, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 803 days.

(21) Appl. No.: 12/483,741

(22) Filed: Jun. 12, 2009

(65) Prior Publication Data
US 2010/0313573 A1 Dec. 16, 2010

(51) Int. Cl.
*F02C 6/08* (2006.01)
*F02C 7/32* (2006.01)
*F02C 9/18* (2006.01)

(52) U.S. Cl. .......................................... 60/785; 60/802

(58) Field of Classification Search .................. 60/782, 60/784, 785, 802; 137/875, 872
See application file for complete search history.

(56) References Cited

U.S. PATENT DOCUMENTS

| | | | | |
|---|---|---|---|---|
| 2,225,071 A * | 12/1940 | Meyerhoefer | ................ | 137/862 |
| 3,116,756 A * | 1/1964 | Alderson | ................... | 137/875 |
| 3,183,930 A * | 5/1965 | Barr | ............................. | 137/875 |
| 3,270,775 A * | 9/1966 | Alderson | ................... | 137/875 |
| 4,091,613 A * | 5/1978 | Young | ............................. | 60/785 |
| 4,380,893 A | 4/1983 | Stokes et al. | | |
| 4,428,194 A | 1/1984 | Stokes et al. | | |
| 4,794,760 A * | 1/1989 | White | ............................. | 60/785 |
| 5,012,646 A * | 5/1991 | Speer | .............................. | 60/728 |
| 5,765,363 A * | 6/1998 | Mowill | .......................... | 60/782 |
| 6,101,806 A | 8/2000 | Chen et al. | | |
| 6,735,951 B2 | 5/2004 | Thompson | | |
| 6,865,891 B2 * | 3/2005 | Walsh et al. | ................... | 60/726 |
| 7,337,605 B2 | 3/2008 | Hagshenas | | |
| 7,367,193 B1 | 5/2008 | Thompson | | |
| 2002/0138158 A1 | 9/2002 | Landreth | | |
| 2006/0230940 A1 * | 10/2006 | Ball et al. | ........................ | 96/413 |
| 2008/0057848 A1 | 3/2008 | Gray et al. | | |

FOREIGN PATENT DOCUMENTS
WO WO2007045646 4/2007

* cited by examiner

*Primary Examiner* — Ted Kim
(74) *Attorney, Agent, or Firm* — Kinney & Lange, P.A.

(57) ABSTRACT

A compressor bleed air valve in an auxiliary power unit ("APU") modulates bleed air flow both for accessory pneumatic systems powered by the bleed air and for reducing or removing surge in the compressor.

20 Claims, 4 Drawing Sheets

APU BLEED VALVE WITH INTEGRAL ANTI-SURGE PORT

BACKGROUND

An auxiliary power unit (APU) system provides auxiliary and/or emergency power to aircraft electrical loads. In conventional APU systems, a dedicated starter motor is operated during a starting sequence to bring a gas turbine engine up to self-sustaining speed, following which the engine is accelerated to operating speed. Once this condition is reached, a generator is coupled to and driven by the gas turbine engine during operation and the generator, in turn, develops electrical power for the electrical loads.

In addition to supplying electrical power to the aircraft, APUs commonly supply pneumatic power to a wide variety of aircraft accessory devices and systems. Accessory system pneumatic power is typically provided by forcing bleed air from the APU compressor section through a main bleed duct to the accessory system's supply. In order to prevent surge of the APU compressor used to power the pneumatic accessory system, it is necessary to maintain a certain minimum flow rate through the main bleed duct regardless of the requirements of the accessory system(s). Surge is a phenomenon that is caused by the detachment of fluid streams along compressor airfoils, which leads to instability in the flow and thereby in the operation of the compressor.

APU-supplied accessory pneumatic systems normally have widely fluctuating compressed air requirements and are automatically controlled to correspondingly regulate the amount of bleed air they receive from the compressor by modulating a bleed air valve. To accommodate a decrease in accessory air demand, and maintain the compressor through flow above its surge level, a surge bleed duct is typically connected to the main bleed duct to provide an alternate outlet flow path for the compressor bleed air as the compressed air requirements of the accessory system decrease or cease altogether. Flow through the surge bleed duct is regulated by modulating an anti-surge valve separate from the main bleed air valve.

There is a continuing need in APU design to reduce cost and complexity by reducing the total part count in the APU system.

SUMMARY

A compressor bleed air valve in an auxiliary power unit ("APU") modulates bleed air flow both for accessory pneumatic systems powered by the bleed air and for reducing or preventing surge in the compressor.

DETAILED DESCRIPTION

Figure 1:
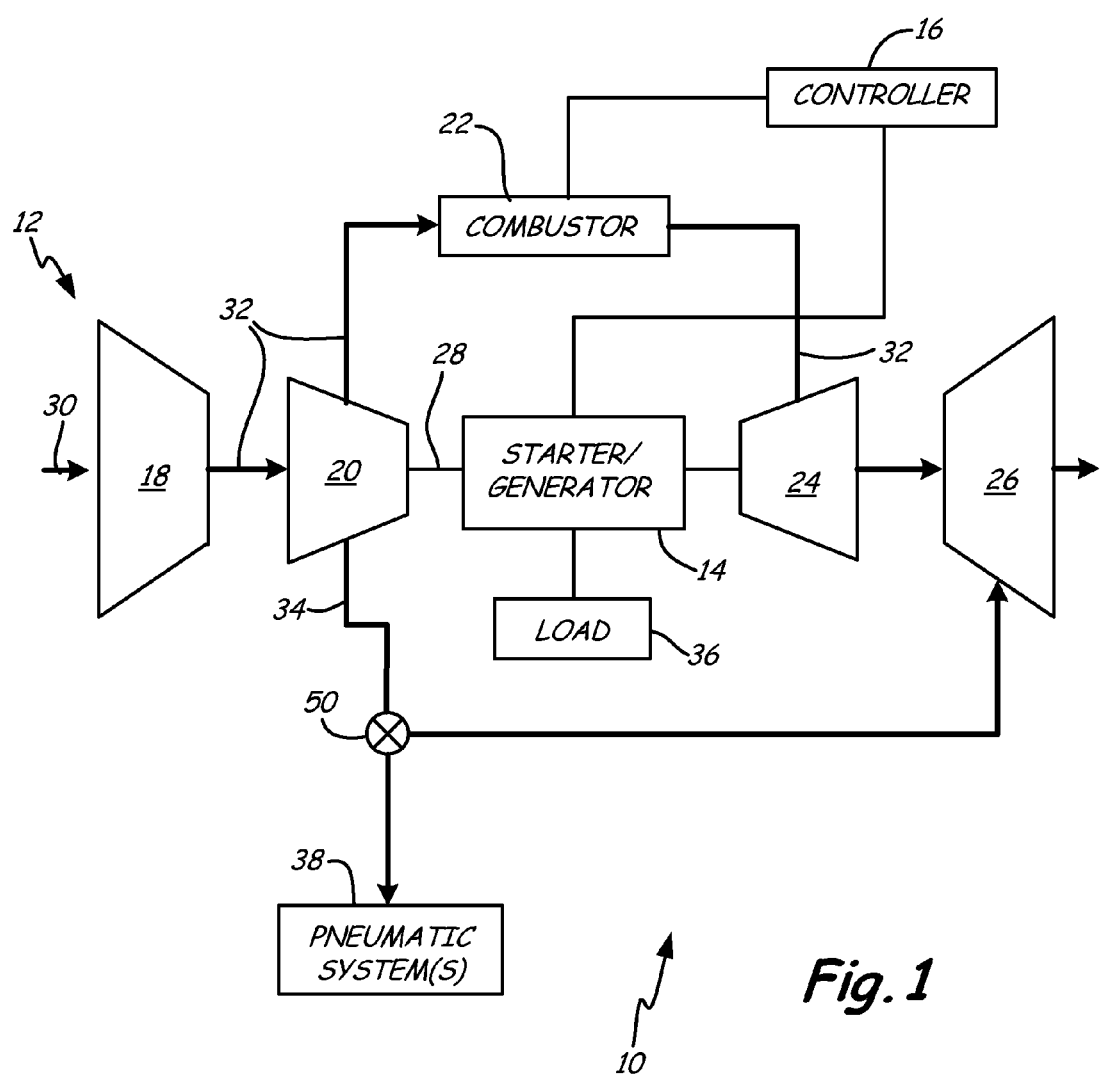
FIG. 1 is a schematic diagram of an auxiliary power unit according to the present invention.

FIG. 1 is a schematic of auxiliary power unit ("APU") 10 that includes gas turbine engine 12, generator 14, and controller 16. Gas turbine engine 12 includes inlet 18, compressor 20, combustor 22, turbine 24, and exhaust 26. Inlet 18 is arranged upstream of compressor 20 with respect to a flow of working medium gas (e.g. air). Compressor 20 and turbine 24 are rotatably connected to one another by a common shaft 28. Generator 14 is also connected to turbine 24 by shaft 28. Combustor 22 is interposed between compressor 20 and turbine 24. Exhaust 26 is arranged downstream of turbine 24. Although the following description is made with reference to an aircraft application, embodiments of the present invention can also improve other non-aircraft APU applications. Additionally, although gas turbine engine 12 is depicted as including one compressor stage and one turbine stage, alternative embodiments of the present invention include APUs with multiple compressor and/or turbine stages including, for example, low pressure and high pressure compressor stages and turbine stages. In embodiments employing multiple compressor and/or turbine stages, various spooling arrangements can be employed including, for example, concentric and non-concentric shafting.

In operation, ambient air 30 is rammed or drawn into and compressed by compressor 20 through inlet 18. Cycle air 32 exiting compressor 20 is communicated to combustor 22 where cycle air 32 is mixed with fuel and burned. Fuel is provided to combustor 22 in a controlled manner, for example, through a control valve or the like (not shown). Hot cycle air 32 from combustor 22 flows to and is expanded through turbine 24. Power generated by turbine 24 drives compressor 20. Turbine 24 also drives generator 14. The common shaft 28 can directly drive generator 14, however, alternative embodiments of the present invention can include, for example, a gearbox driven generator (not shown). Electrical generator 14 can be a starter/generator which also operates as an electrically powered starter motor to spin up compressor 20 to light-off gas turbine engine 12. Generator 14 powers multiple of electrical loads 36 and communicates with controller 16. The controller 16 can optimize operation of APU 10 by receiving sensor inputs including, for example, shaft speed, fuel flow, and applied electrical load. Controller 16 can include, for example, a digital microprocessor-based or analog electronic system or any other electronic controller appropriate for use with APU 10.

In addition to cycle air 32 exiting compressor 20, bleed air 34 is drawn from the discharge of compressor 20 to power accessory pneumatic system(s) 38, which can include, for example, an aircraft cabin air conditioning system and a wing de-icing system. Bleed air 34 drawn from compressor 20 is regulated by modulating bleed air valve 50 according to the present invention. In embodiments of the present invention, bleed air valve 50, depending on the particular operating conditions, will alternatively supply bleed air to pneumatic system(s) 38 or vent air overboard through exhaust 26 to prevent surge in compressor 20.

Figure 2A:
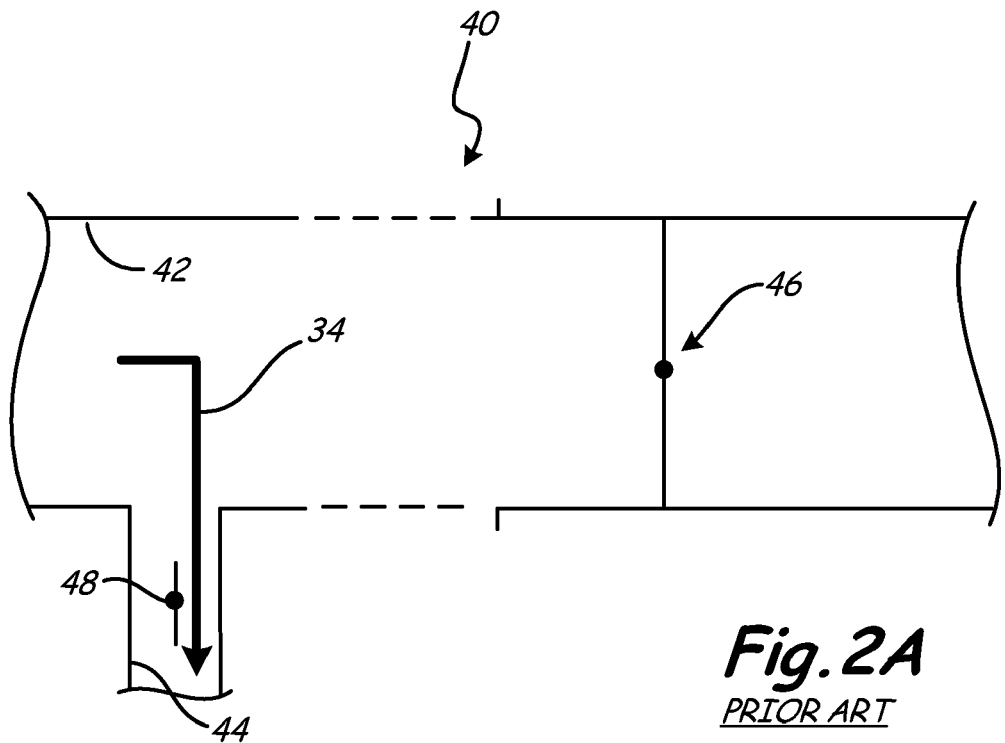
FIGS. 2A and 2B are schematic diagrams of a portion of a prior art APU system that includes separate compressor bleed air and anti-surge valves.
Figure 2B:
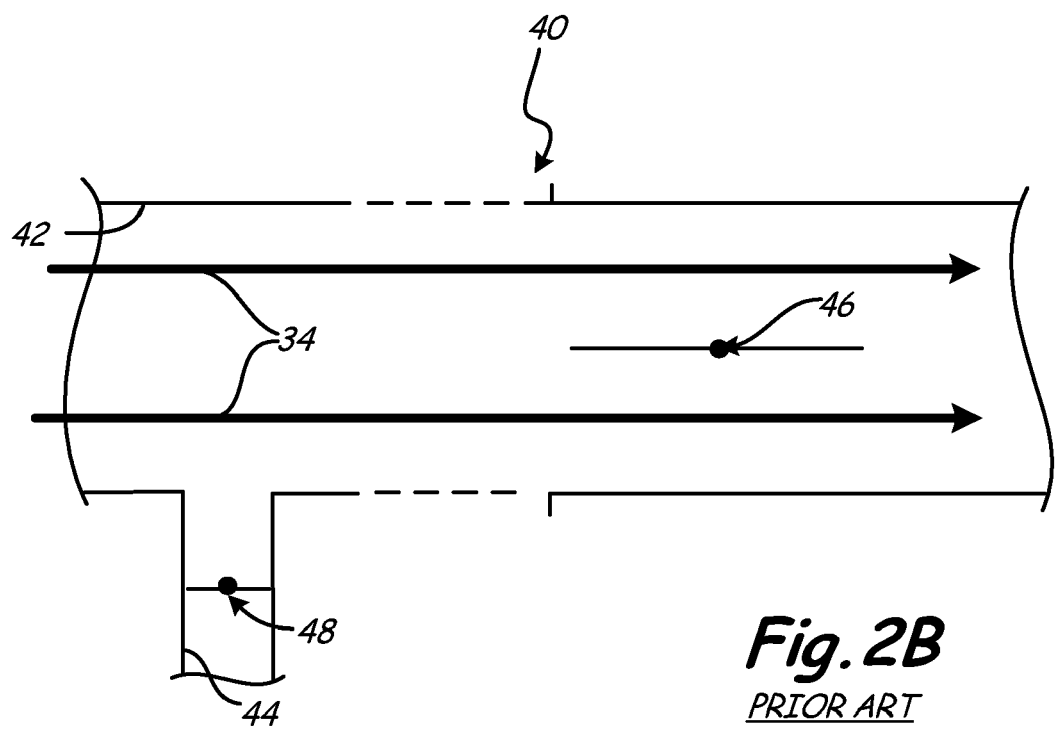

Regardless of the use of compressor bleed air 34 by aircraft accessory pneumatic system(s) 38, APU 10 will commonly require some minimum amount of bleed air flow from compressor 20 to operate surge free. Accessory system bleed air and anti-surge bleed air requirements have previously been accomplished with a separate anti-surge bleed valve upstream of the main bleed air valve. For example, FIGS. 2A and 2B are schematics of a portion of prior art APU system 40 that includes primary flow conduit 42 and secondary flow conduit 44 with separate bleed air valve 46 and anti-surge valve 48 positioned therein respectively. Primary flow conduit 42 is connected, in the direction of flow of bleed air 34, upstream to APU compressor 20 (see FIG. 1) and downstream to aircraft accessory pneumatic systems 38 (see FIG. 1). Secondary flow conduit 44 is in flow communication with primary conduit 42 and with, for example APU exhaust 26 (see FIG. 1). FIG. 2A shows bleed air valve 46 closed and compressor bleed air 34 flowing from primary conduit 42 through open anti-surge valve 48 in secondary conduit 44. During periods of no aircraft demand for bleed air, anti-surge valve 48 is opened as shown in FIG. 2A, allowing bleed air 34 to be vented overboard, typically through APU exhaust 26. FIG. 2B shows conventional system 10 with separate bleed air valve 46 open. With bleed air 34 flowing through open bleed air valve 46 in primary conduit 42, no anti-surge flow is required. Therefore, in FIG. 2B, anti-surge valve 48 is closed.

To reduce the cost and complexity of APU systems, embodiments of the present invention integrate the functions of accessory system bleed air and anti-surge bleed air into a single valve that modulates bleed air flow to both a primary conduit (accessory system bleed air) and a secondary conduit (anti-surge bleed air).

Figure 3A:
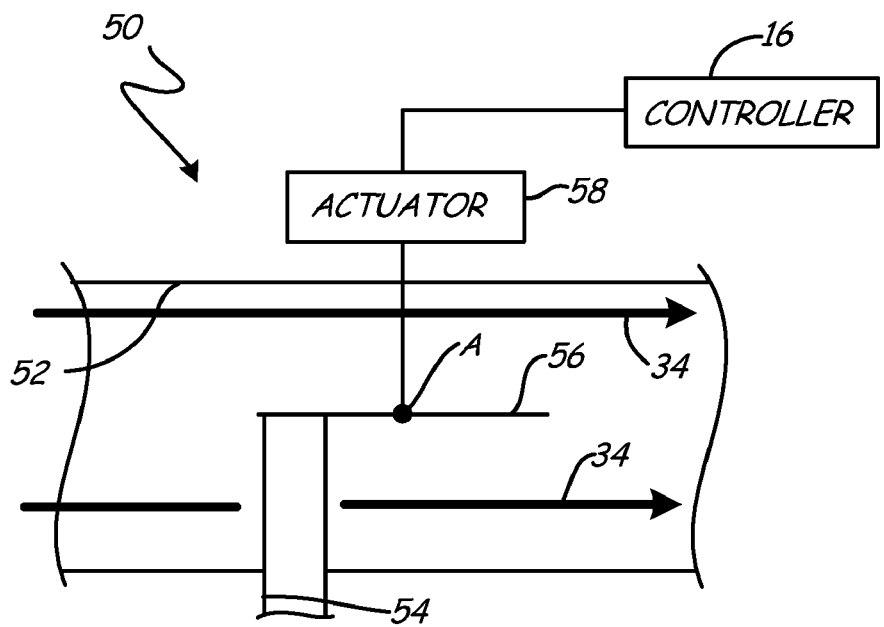
FIGS. 3A and 3B are schematic diagrams of an APU bleed air valve according to the present invention.
Figure 3B:
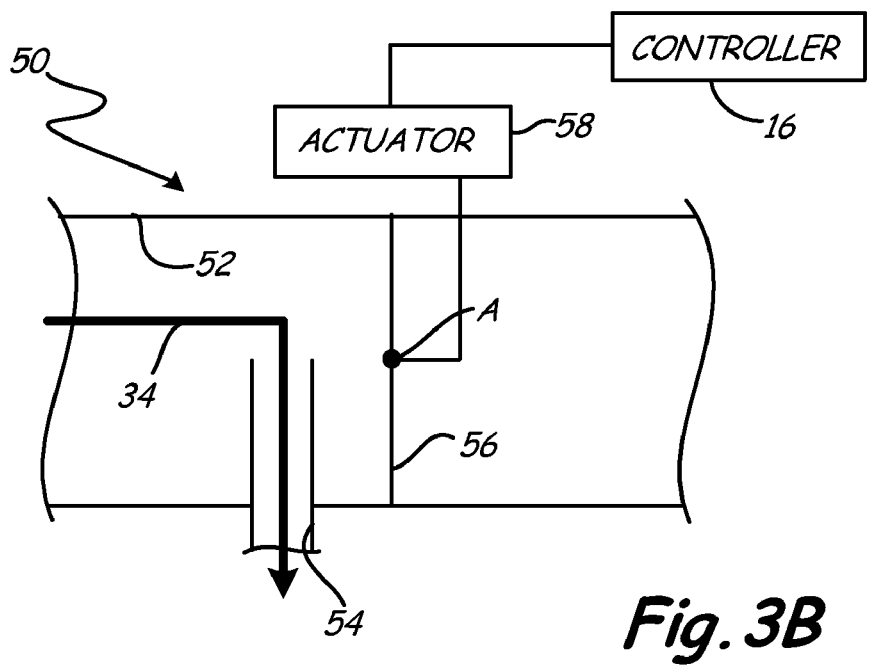

FIGS. 3A and 3B are schematics of APU bleed air valve 50 according to the present invention, which includes primary flow conduit 52, secondary flow conduit 54, and flow inhibitor 56. Primary flow conduit 52 is connected, in the direction of flow of bleed air 34, upstream to APU compressor 20 (see FIG. 1) and downstream to aircraft accessory pneumatic system(s) 38 (see FIG. 1). Secondary flow conduit 54 is in flow communication with primary conduit 52 and with, for example, APU exhaust 26 (see FIG. 1). Secondary conduit 54 can include, for example, a tube that protrudes partially into primary conduit 52 as shown in FIGS. 3A and 3B. Both primary and secondary conduits 52, 54 may be constructed from any material appropriate for the pressure and temperature requirements of the intended application of bleed air valve 50 in an aircraft or other APU. Secondary conduit 54 is positioned upstream from flow inhibitor 56. Flow inhibitor 56 is arranged within primary conduit 52.

During operation of bleed air valve 50 to modulate extraction of bleed air from an APU compressor for accessory system use and anti-surge protection, flow inhibitor 56 may be positioned to alternatively allow bleed air 34 to flow only through primary conduit 52 to one or more accessory systems or only through secondary conduit 54 to reduce or prevent surge in the APU compressor. FIG. 3A shows flow inhibitor 56 in a first position that allows bleed air 34 to flow through primary conduit 52 and substantially prevents bleed air 34 from flowing into secondary conduit 54. In the first position, flow inhibitor 56 is approximately parallel to the direction of flow of bleed air 34 to allow flow through primary conduit 52 and to substantially cover the end of secondary conduit 54 protruding into primary conduit 52. FIG. 3B shows flow inhibitor 56 in a second position that substantially prevents bleed air 34 from flowing through primary conduit 52 and allows bleed air 34 to flow out of primary conduit 52 into secondary conduit 54. In the second position, flow inhibitor 56 is approximately perpendicular to the direction of flow of bleed air 34 blocking flow of bleed air 34 within primary conduit 52 and redirecting bleed air 34 into secondary conduit 54. Alternative embodiments can include secondary conduit 54 positioned differently within primary conduit 52 and flow inhibitors that may be set to different positions than shown in the embodiment of FIGS. 3A and 3B.

Flow inhibitor 56 can include, for example, a butterfly disk pivotally mounted at pivot axis A within primary conduit 52. Flow inhibitor 56 can be connected to actuator 58 that is operable to rotate inhibitor 56 about pivot axis A. Actuator 58 can be connected to and controlled by APU controller 16 to position flow inhibitor 56 in the appropriate position for the particular operating conditions of the APU in which bleed air valve 50 is employed.

APU controller 16 and actuator 58 may control movement of flow inhibitor 56 in a way that provides for longer life of the butterfly valve disk of flow inhibitor 56 and the mating end surface of secondary conduit 54. The butterfly valve disk (flow inhibitor 56) needs to form a seal against the end surface of stationary conduit 54, and will impact the end surface during opening of the valve when flow inhibitor 56 moves from the closed position shown in FIG. 3B to the open position shown in FIG. 3A. APU controller 16 supplies control signals to actuator 58 to provide for the typically required fast valve response, while also reducing the slew rate of movement of flow inhibitor 56 as it approaches the mating end surface of secondary conduit 54. The reduced slew rate reduces impact contact loads, which avoids damage to the end surface of secondary conduit 54. The control of actuator 58 to produce the desired movement profile for flow inhibitor 56 may be implemented by software, firmware or hardware associated with APU controller 16.

Figure 4A:
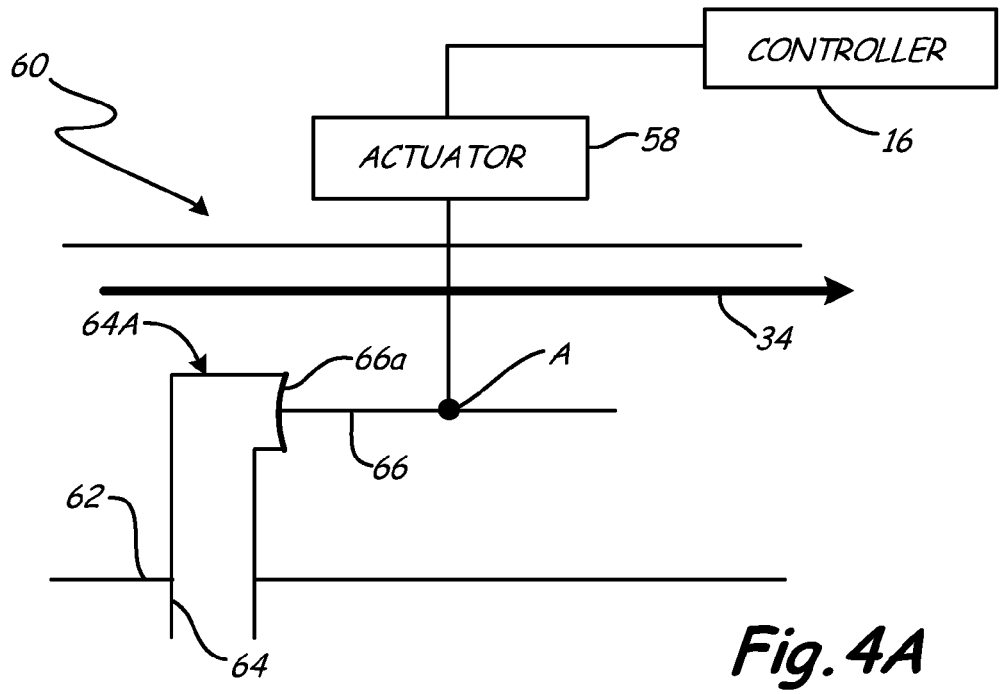
FIGS. 4A and 4B are schematic diagrams of an alternative APU bleed air valve according to the present invention.
Figure 4B:
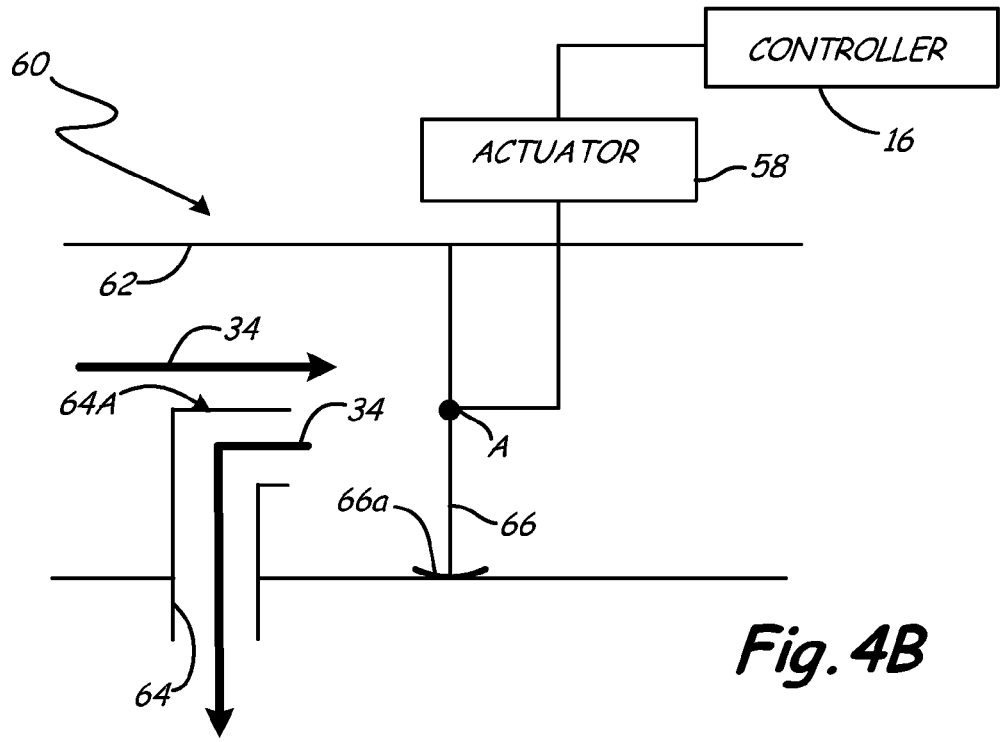

FIGS. 4A and 4B are schematics of alternative APU bleed air valve 60 according to the present invention, which includes primary flow conduit 62, secondary flow conduit 64, and flow inhibitor 66. Primary flow conduit 62 is connected, in the direction of flow of bleed air 34 within primary conduit 62, upstream to APU compressor 20 (see FIG. 1) and downstream to aircraft accessory pneumatic system(s) 38 (see FIG. 1). Secondary flow conduit 64 is in flow communication with primary conduit 62 and with, for example, APU exhaust 26 (see FIG. 1). Secondary conduit 64 can include, for example, a tube that protrudes partially into primary conduit 62. In the embodiment of FIGS. 4A and 4B, secondary conduit 64 includes elbow 64a that turns secondary conduit 64 in the direction of flow of bleed air 34 within primary conduit 62. Both primary and secondary conduits 62, 64 may be constructed from any material appropriate for pressure and temperature requirements of the intended application of bleed air valve 60 in an aircraft or other APU. Secondary conduit 64 is positioned upstream from flow inhibitor 66. Flow inhibitor 66 is arranged within primary conduit 62 and includes contoured member 66a. Contoured member 66a is connected to an edge of flow inhibitor 66 such that member 66a is arranged transverse to flow inhibitor 66.

During operation of bleed air valve 60 to modulate extraction of bleed air from an APU compressor for accessory system use and anti-surge protection, flow inhibitor 66 may be positioned to alternatively allow bleed air 34 to flow only through primary conduit 62 to one or more accessory systems or only through secondary conduit 64 to reduce or prevent surge in the APU compressor. FIG. 4A shows flow inhibitor 66 in a first position that allows bleed air 34 to flow through primary conduit 62 and substantially prevents bleed air 34 from flowing into secondary conduit 64. In the first position, flow inhibitor 66 is approximately parallel to the direction of flow of bleed air 34 and contoured member 66a engages secondary conduit 64 downstream of elbow 64a to substantially prevent bleed air 34 from flowing into secondary conduit 64. FIG. 4B shows flow inhibitor 66 in a second position that substantially prevents bleed air 34 from flowing through primary conduit 62 and allows bleed air 34 to flow from primary conduit 62 into secondary conduit 64. In the second position, flow inhibitor 66 is approximately perpendicular to the direction of flow of bleed air 34 blocking flow of bleed air 34 within primary conduit 62 and redirecting bleed air 34 into secondary conduit 64. Contoured member 66a is shaped to cooperatively abut an interior surface of primary conduit 62 when flow inhibitor 66 is in the second position. Alternative embodiments of the present invention can include secondary conduit 64 positioned differently within primary conduit 62 and flow inhibitors that may be set to different positions than shown in the embodiment of FIGS. 4A and 4B.

Flow inhibitor 66 can include, for example, a butterfly disk pivotally mounted at A within primary conduit 62. Flow inhibitor 66 can be connected to actuator 58 that is operable to rotate inhibitor 66 about pivot axis A. Actuator 58 can be connected to and controlled by APU controller 16 to position flow inhibitor 66 in the appropriate position for the particular operating conditions of the APU in which bleed air valve 60 is employed.

Embodiments of the present invention combine accessory system bleed air and anti-surge bleed air functions into a single valve that may be employed in APUs. By removing the need for separate accessory bleed air and anti-surge bleed air valves common in prior systems, embodiments of the present invention reduce the cost and complexity of manufacturing, installing, and maintaining APUs used in aircrafts and other platforms that require auxiliary pneumatic power generation.

Although the present invention has been described with reference to particular embodiments, workers skilled in the art will recognize that changes may be made in form and detail without departing from the scope of the invention as defined by the claims that follow.

The invention claimed is:

1. An auxiliary power unit (APU) comprising:
    a compressor that compresses air flowing into the APU;
    a combustor connected to the compressor to receive a portion of the compressed air;
    a turbine for receiving combustion gas from the combustor;
    an exhaust downstream of the turbine; and
    a bleed air valve that modulates a flow of air bled from the compressor, the bleed air valve comprising:
        a primary conduit connected between the compressor and a pneumatic system;
        a secondary conduit in flow communication with the primary conduit and connected to the exhaust; and
        a flow inhibitor arranged within the primary conduit and movable between a first position that allows the bleed air to flow through the primary conduit to the pneumatic system and substantially prevents the bleed air from flowing into the secondary conduit and to the exhaust, and a second position that substantially prevents the bleed air from flowing through the primary conduit to the pneumatic system and allows the bleed air to flow from the primary conduit into the secondary conduit and to the exhaust;
        wherein the secondary conduit comprises a tube with a free inlet end protruding into the primary conduit, wherein the free inlet end is blocked in the first position and open in the second position.

2. The APU of claim 1, wherein the flow inhibitor comprises a butterfly disk pivotally mounted within the primary conduit.

3. The APU of claim 2 further comprising an actuator operable to rotate the butterfly disk within the primary conduit.

4. The APU of claim 2, wherein the first position of the butterfly disk is approximately parallel to a direction of flow of the bleed air within the primary conduit.

5. The APU of claim 4, wherein the second position of the butterfly disk is approximately perpendicular to a direction of flow of the bleed air within the primary conduit.

6. The APU of claim 5, wherein the butterfly disk in the first position substantially covers the free inlet end of the tube protruding into the primary conduit.

7. The APU of claim 6, wherein the butterfly disk further comprises a contoured member attached to an edge of the butterfly disk and arranged transverse to the butterfly disk.

8. The APU of claim 7, wherein the contoured member is shaped to engage the free inlet end of the tube within the primary conduit when the butterfly disk is in the first position and to cooperate with an interior surface of the primary conduit when the butterfly disk is in the second position.

9. The APU of claim 5, wherein the tube further comprises an elbow in the direction of flow of the bleed air within the primary conduit.

10. The APU of claim 1 and further comprising:
    an actuator for moving the flow inhibitor between the first and second positions; and
    a controller for controlling the actuator to cause the actuator to reduce a slew rate of movement of the flow inhibitor as the flow inhibitor approaches the first position.

11. A compressor bleed air valve for an auxiliary power unit (APU) having a combustor, a gas turbine, and an exhaust downstream of the gas turbine, the compressor bleed air valve comprising:
    a primary conduit connected between a bleed air outlet of a compressor of the APU and a pneumatic system;
    a secondary conduit in flow communication with the primary conduit and connected to the exhaust downstream of the gas turbine of the APU; and
    a flow inhibitor arranged within the primary conduit, the flow inhibitor being movable, between a first position that allows the bleed air to flow through the primary conduit to the pneumatic system and substantially prevents the bleed air from flowing into the secondary conduit and to the exhaust and a second position that substantially prevents the bleed air from flowing through the primary conduit to the pneumatic system and allows the bleed air to flow from the primary conduit into the secondary conduit and to the exhaust; wherein the secondary conduit comprises a tube with a free inlet end protruding into the primary conduit, wherein the free inlet end is blocked in the first position and open in the second position.

12. The valve of claim 11, wherein the flow inhibitor comprises a butterfly disk pivotally mounted within the primary conduit.

13. The valve of claim 12 further comprising an actuator operable to rotate the butterfly disk within the primary conduit.

14. The valve of claim 13, wherein the actuator reduces a slew rate of movement of the butterfly disk as the butterfly disk approaches the first position.

15. The valve of claim 12, wherein the first position of the butterfly disk is approximately parallel to a direction of flow of the bleed air within the primary conduit.

16. The valve of claim 15, wherein the second position of the butterfly disk is approximately perpendicular to a direction of flow of the bleed air within the primary conduit.

17. The valve of claim 16, wherein the butterfly disk in the first position substantially covers the free inlet end of the tube protruding into the primary conduit.

18. The valve of claim 16, wherein the tube further comprises an elbow in the direction of flow of the bleed air within the primary conduit.

19. The valve of claim 18, wherein the butterfly disk further comprises a contoured member attached to an edge of the butterfly disk and arranged transverse to the butterfly disk.

20. The valve of claim 19, wherein the contoured member is shaped to engage the free inlet end of the tube within the primary conduit when the butterfly disk is in the first position and to cooperate with an interior surface of the primary conduit when the butterfly disk is in the second position.

* * * * *